United States Patent [19]

Graeme-Barber et al.

[11] 4,375,199
[45] Mar. 1, 1983

[54] SUBMERSIBLE OR SEMI-SUBMERSIBLE STRUCTURES

[75] Inventors: Christopher Graeme-Barber; Donald S. Painter, both of Cambridge, England

[73] Assignee: United Wire Group p.l.c., Edinburgh, England

[21] Appl. No.: 232,201

[22] Filed: Feb. 6, 1981

Related U.S. Application Data

[63] Continuation-in-part of Ser. No. 25,568, Jan. 11, 1979, abandoned.

[30] Foreign Application Priority Data

Jan. 11, 1978 [GB] United Kingdom ............... 996/78

[51] Int. Cl.³ ............................................. B63B 59/02
[52] U.S. Cl. .................................. 114/222; 114/67 R
[58] Field of Search ................... 114/67 R, 67 A, 222; 204/147–149, 196, 197

[56] References Cited

U.S. PATENT DOCUMENTS

| 3,497,990 | 3/1970 | Jeffries | 114/222 |
| 3,620,943 | 11/1971 | White | 114/222 |
| 3,971,084 | 7/1976 | Spier | 114/222 |
| 4,170,185 | 10/1979 | Murphy et al. | 114/222 |

Primary Examiner—Trygve M. Blix
Assistant Examiner—Jesús D. Sotelo
Attorney, Agent, or Firm—Watson, Cole, Grindle & Watson

[57] ABSTRACT

A submersible or semi-submersible structure, such as a boat, oil rig or pipeline, has an anti-fouling covering secured thereto. The covering comprises a mesh of copper or copper alloy embedded in a carrier, preferably of plastics material. The mesh has knuckles which on one surface are close to or protrude from the carrier so as to be accessible to sea water. The knuckles are spaced from the other surface so as to prevent contact between the structure and the mesh. A sea water permeable coating may be provided on the outer surface.

28 Claims, 4 Drawing Figures

SUBMERSIBLE OR SEMI-SUBMERSIBLE STRUCTURES

This application is a Continuation-in-Part of Application Ser. No. 2,568 filed Jan. 11, 1979 and now abandoned.

FIELD OF THE INVENTION

This invention relates generally to the retardation of marine growth on submersible or semi-submersible structures.

Marine growth, for example slimes, barnacles, tubeworm, molluscs and certain animal organisms such as sponges and anemones, adversely affect such structures and may accelerate corrosion.

On ships the major impact of marine growth is on operating efficiency where a 30% increase in resistance can occur after only one year. This in turn leads to an equivalent increase in power requirements for a constant operating speed or to a loss of speed, for example 3 knots or more on a 15.5 knot tanker. On ships' hulls certain molluscs such as mussels are unable to adhere to the surface of the structures at normal operational speeds. Molluscs do, however, adhere to the surface when the ship travels at low speeds or is at rest. Furthermore, fouling by other growth requires the ship to be put into dry dock at regular intervals for cleaning and re-painting, or at least to be put into a calm site for inwater cleaning of the hull.

Offshore structures such as oil rigs present ideal static surfaces for the attachment and growth of marine organisms. Layers of fouling have been known to increase the overall diameters of members of offshore structures by up to 2 feet, thus increasing wave loading on the structure and making difficult the task of inspection and maintenance particularly of sensitive areas such as nodes.

Outfall pipes, buoys and mooring points can also be seriously affected and removal of fouling from concrete structures can cause surface damage. Unattended subsea installations such as well-head completions may be so camouflaged with fouling that they may be extremely difficult to find when required.

DESCRIPTION OF THE PRIOR ART

It has long been known to use copper to retard or prevent marine growth on structures subjected to sea water. Copper sheets were commonly fixed to the hulls of wooden ships to prevent such growth. However the use of copper sheets is impractical on structures of ferrous metal, for example ships' hulls or fixed off-shore structures, because of the expense of cladding with copper sheets and also because contact between the copper and the structure results in extreme corrosion of the ferrous metal and rapid deterioration of the structure.

More recently it has been common practice to coat the structure with a paint containing copper salts from which the copper ions are released to poison the marine growth. A disadvantage of such a method is that the life of the coating is relatively short and repainting has to be carried out at frequent regular intervals, commonly about every two years.

Other attempts to provide practical marine growth inhibitors for ships have been proposed, but none have so far been commercially successful or applicable to most existing and new submersible or semi-submersible structures U.S. Pat. No. 4,170,185, for example, shows the use of strips attached to the hull of a ship. The strips vibrate to discourage the adherence of such marine growth as barnacles, bryozoan, marine worms and mussels, i.e. that growth which does not adhere to the hull at high speeds. The strips would not prevent or retard the growth on the hull of other marine life which would adhere to the hull at normal operating speeds and the ship would still have to be put into dry dock for removal of such growth.

Another proposal for the retardation of marine growth is set out in U.S. Pat. No. 3,971,084. That patent discloses the formation of a composite fibre glass hull structure having at the outer surface of the hull an expanded mesh of copper or copper alloy. The expanded mesh has a surface area of some 70% of the hull area. To fabricate the hull, the expanded mesh is placed in a mould, the interstices thereof are filled with fibre glass and the inner layers of the hull are made up in known manner using woven fibre glass and epoxy resin.

The composite construction has a number of disadvantages. Firstly, because of the high surface exposure of the metal the expanded mesh is relatively rigid and difficult to handle. The expanded mesh would only be suitable for composite moulding processes such as described where the mould supports the expanded mesh during manufacture of the hull. In use, when the copper is leached by the water, there would remain on the hull large cavities which would considerably increase the surface roughness of the hull and thus increase the hull drag coefficient. Such a large drag increase could have an effect which is greater than that of the adherence of marine growth if the expanded mesh were absent. In other words, whilst the exposure of metal would in the early life of the ship reduce the drag and improve fuel consumption, as the large copper alloy area is leached away the drag would increase, thus defeating the object of providing the expanded copper alloy mesh.

Furthermore, if the spaces formed by the fibreglass interstices in the expanded mesh are of too large a size growth of marine organisms will occur on the uncovered fibre glass.

U.S. Pat. No. 3,971,084 effectively describes a means of forming a surface which is predominantly cupronickel. It therefore leaches out more copper and other metallic ions than are necessary to keep the surface free from fouling and could contribute unnecessarily to pollution in harbours. In addition, the predominance of metal prevents the material from being effectively coloured to allow its use, for example, to prevent fouling from obscuring the colour of navigation buoys, and the excessive production of copper ions could limit its use, e.g. in the prevention of fouling in fish farms where excessive copper ions in the water could be harmful to the fish. Furthermore, in the presence of cathodic protection systems the excessive amount of copper ions could in static conditions poison nearby anodes thus rendering the system ineffective.

Another drawback is that once the expanded copper mesh is leached away it is practically irreplaceable. As disclosed in the said patent replacement copper could be sprayed on to the hull, but such a method would be extremely expensive and time consuming and require specialist equipment.

Yet another drawback of the composite hull construction of the patent is that the large surface area of copper necessitates a large volume of expanded copper mesh which at present day copper prices is extremely expensive.

Because of the above-described drawbacks the construction described in the patent would have only limited utility.

Accordingly an object of the present invention is to provide a submersible or semi-submersible structure having a surface layer of material which inhibits marine growth.

Another object is to provide a marine growth inhibiting material which is relatively cheap and easy to produce and which can be applied to new or existing metallic structures, such as to ships' hulls, oil rigs or pipelines.

Another object is to provide a marine growth inhibiting material which liberates only the minimum amount of copper necessary to fulfil its function thus minimising pollution and extending its possible effective uses.

Another object of the invention is to provide a marine growth inhibiting material which can be coloured to any desired colour thus enabling it to be used for all applications which otherwise would require an antifouling paint of shorter lifetime.

SUMMARY OF THE INVENTION

The present invention provides a submersible or semi-submersible anti-fouling structure comprising a layer of carrier material and a mesh of copper or copper alloy embedded in said material, the knuckles of the said mesh being exposed at the outer surface of said layer so as to be accessible to sea water for retarding or preventing marine growth on said structure, wherein the area of exposed mesh is less than 50% of the total area of the outer surface of the layer.

The exposed metal consists of discrete area of metal in a continuous plastic surface, the discrete metal areas being dispersed over the surface according to a frequency which achieves a fouling free composite surface.

Because the bulk of the metal is below the plastic surface and because the area through which it can leach is limited the life of the composite per unit of metal incorporated is very considerable.

Tests made so far indicate that for effective resistance to fouling to be conferred over the whole surface it is necessary to have a minimum area of exposure of metal knuckles combined with a maximum spacing of fibre glass surface between them.

The minimum desirable area of exposure of metal is of at least 13% and the maximum necessary area is 50%. Thus to have a larger area of exposure merely dramatically increases cost without any benefit.

Combined with the above metal exposure ratios, our tests also show that a minimum frequency of distribution of metal areas on the surface is necessary. For example for most applications a mesh size of 3 to 60 mesh per inch with all the knuckles in one plane on one side of the wire cloth exposed provides good antifouling properties. However it is preferred to have a size of from 6 to 20 mesh per inch. Even if young molluscs, for example, adhere to the covering in the interstices between the exposed knuckles of the larger mesh sizes, they are killed and fall off as soon as they grow sufficiently to touch the metal of the mesh.

The invention also provides an anti-fouling panel for attachment to the surface of a submersible or semi-submersible structure, said panel comprising a layer of carrier material and a mesh of copper or copper alloy embedded in said material, said mesh being exposed at the outer surface of said layer so as to be accessible to sea water for retarding or preventing marine growth on said panel.

The advantage of such panels is that they can be attached in juxtaposition on existing ships or offshore structures. Such attachment is conveniently by using an epoxy resin adhesive after cleaning of the structure surfaces, for example by grit blasting. Depending on the size of mesh the panels are relatively flexible and can be produced flexible enough to conform to the shape of a ships' hull or to a pipe. In fact, the panels have been shown to be capable of conforming to a pipe of radius of only one inch. The panels may, however, be secured to the structure by mechanical means, for example by tying. The panels may be formed by any suitable means, for example casting, spreading, hot pressing, or calendering. Preferably, the thickness of each panel is between 0.05 mm and 2.00 mm.

The carrier layer is preferably of a plastics material, for example a thermoplastic polymer, such as polypropylene, or a thermosetting polymer, such as a polyester. Such a polymer may be used with a glass fibre reinforcement either as a mat or in the form of random choppings or rovings.

Pure copper or many copper alloys could be used as the material for the mesh, preferably with a copper content of at least 60%. It is envisaged for example that for use in static conditions, such as on fixed offshore structures, or for low-speed application, bronze could be used containing, for example, from 95% copper. For higher speed applications, for example on ships' hulls, cupronickels could be used, for example approximately a 90/10 alloy with small amounts of iron and/or other elements, the alloy constituents being changed to improve errosion/corrosion properties for increased speed of operation. Other copper alloys could also be used, for example aluminium bronze containing a proportion of copper greater than 99%. It has been found that, generally the greater the copper content of an alloy, the greater its effectiveness in retarding marine growth.

Conveniently, the mesh size is in the range of 3–60 mesh/inches (1.2:−24 mesh/cm.), the wire diameter being of from 0.05 to 1.5 mm. We have discovered that for the reduction of certain marine growth it is desirable to use a mesh size of at least 12 mesh/inch (4.7 mesh/cm.) but considering other factors, such as ease of production and costs, the optimum mesh size is probably in the region of 20 mesh/inch (8.0 mesh/cm).

Preferably, the mesh is exposed to the sea water at the outer surface, the knuckles preferably protruding through or being level with the outer surface of the carrier material. The knuckles are preferably all in the same plane, so that for a given mesh size and wire gauge more metal is available at the outer surface which is in use subjected to sea water, and are regularly spaced apart. For mesh of pure copper our investigations indicate that the area of exposure of the metal is desirably greater than about 13% of the area of the covering.

Optionally, the carrier material could be applied directly to the structure, for example by spraying the carrier material on to the structure and embedding the mesh in the carrier on the structure.

In order that the mesh may project from the outer surface of the covering and in use be in direct contact with the sea water the panels may be formed with the mesh exposed at the outer surface, or the outer surface may be abraded to expose the mesh.

However, particularly for movable structures the mesh need not be exposed and in direct contact with the sea water but may be coated with a layer of coating material which is permeable to water, preferably a thin coating of plastics material through which the copper can diffuse. The surface coating may take the form of a polyester or epoxy film which may be filled, either with an insoluble material which enhances the water permeability of the layer, such as cotton fibre, wood fibre or wood flour, or with a water soluble material such as copper oxide which would be leached by the sea water to give a porous structure. Optionally, the coating film may be of the same material as the carrier and integral with the carrier.

BRIEF DESCRIPTION OF THE DRAWINGS

A boat having a covering in accordance with the invention will now be described, by way of example, with reference to the accompanying drawings, in which.

DESCRIPTION OF THE PREFERRED EMBODIMENTS

Each panel P comprises a layer 1 of carrier material in the form of a glass-reinforced polyester and a mesh 2 of copper alloy embedded therein. The alloy has a copper content of at least 70% and preferably greater than 90%.

Figure 3:
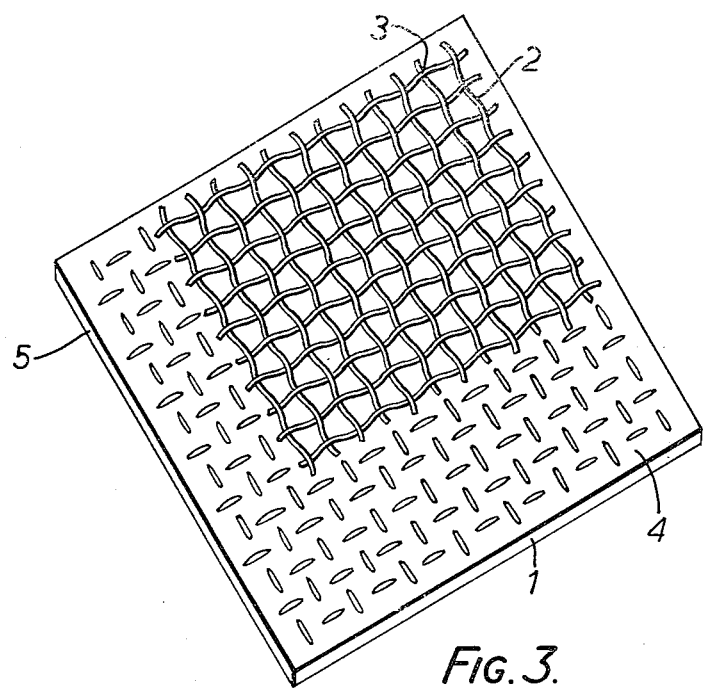
FIG. 3 is a perspective view of one form of panel partly cut away to illustrate a mesh configuration.

The mesh has knuckles 3 which, in the form of panel illustrated in FIG. 3, protrude through, or are level with, the front surface of the panel so as to be in direct contact with the sea water. However, the knuckles are not level with the rear surface 5 of the panel.

Conveniently, the panel is formed by embedding the mesh 3 in the carrier material and abrading the outer surface to expose the knuckles of the mesh.

Figure 4:
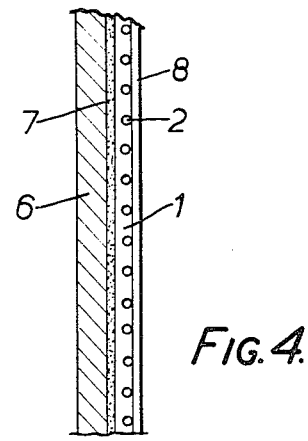
FIG. 4 is an enlarged detail section of another form of panel attached to the hull of the boat.

In an alternative form of panel illustrated in FIG. 4 the panel is secured to the hull 6 of the boat by an adhesive layer 7 and is covered by a thin layer 8 of resin material, filled with cotton fibre or the like, through which sea water can permeate. Optionally, the mesh may be totally embedded in the carrier material 1, a thin layer of the carrier material coating the mesh and being permeable by sea water.

In each form of panel the knuckles are regularly spaced apart, the distance between adjacent knuckles being from 0.25 to 7 mm.

In use a plurality of such panels are secured to the surface of a structure, for example a ship's hull, with the rear surface 5 being bonded by suitable cement to the structure. Because the copper alloy mesh is insulated from the rear surface 5, there can be no electrochemical interaction between the mesh and the structure. Furthermore the carrier material and cement provide a barrier which effectively reduces corrosion of the structure by sea water.

The mesh may be woven or knitted, or may be an expanded metal mesh. In the case of woven or knitted meshes, the copper strands may be interwoven with strands of other material, for example plastics. As an example, the copper strands may all extend in one direction and the plastics strands in the other direction. Such a configuration has a considerable advantage over meshes which consist of metal strands woven in each direction, over cupro-nickel or copper alloy plate attached directly or indirectly to a ship's hull and over the technique for affixing cupro-nickel or copper alloy sheet to a fibre glass hull described in U.S. Pat. No. 3,971,084. In all of the latter cases any contact inadvertent or otherwise with a more base metal, e.g. iron or zinc, in the presence of sea water will cause an electrochemical reaction to occur in which the base metal will corrode preferentially and the copper alloy will not release copper ions and therefore the whole sheet of copper alloy will lose its antifouling property. In the case of a woven mesh where the strands in one direction are copper alloy and those in the other direction are mono or multifilament plastic, the copper alloy strands will be insulated from one another and if contact with a base metal does occur the complete sheet of composite will not lose its antifouling activity, only those strands in contact with the base metal.

In standard woven meshes, half the number of knuckles on one side of the mesh are generally disposed in one plane and the other half are disposed in a different plane, the planes being slightly spaced apart. Thus, considering both surfaces of the mesh, the knuckles lie in four different planes. It is preferred in the present embodiment that the knuckles on each side of the mesh are disposed in a single plane. In this way all the knuckles are disposed in only two different planes, one on each side of the mesh so that the knuckles on the outer surface project from or are level with the front carrier surface 4. The formation of knuckles in a single plane may be achieved for example by rolling standard meshes or by a suitable weaving process.

It will be appreciated that to achieve an exposure area of the order of 70%, as suggested in U.S. Pat. No. 3,971,084, is not practical using woven, rather than expanded, mesh because it would be wasteful in the amount of metal abraded to expose the knuckles and costly in terms of weaving a mesh with such a high bulk metal content.

Figure 1:
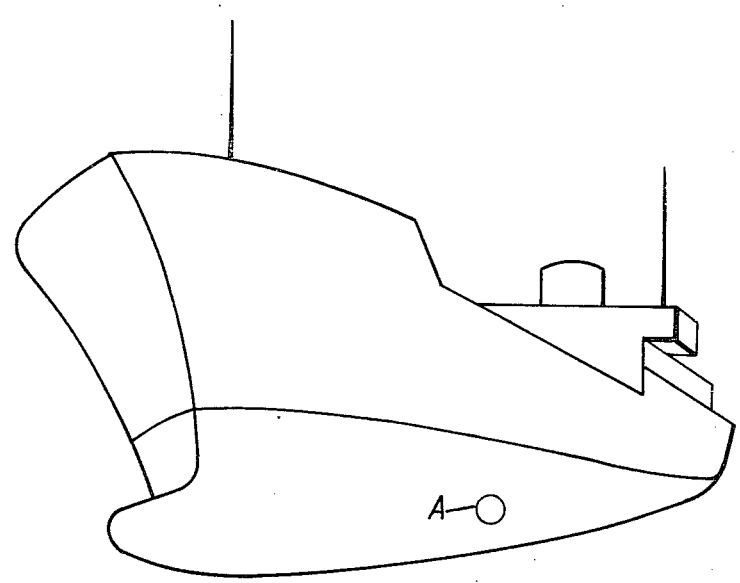
FIG. 1 is a perspective view of the boat having panels secured to the hull thereof.
Figure 2:
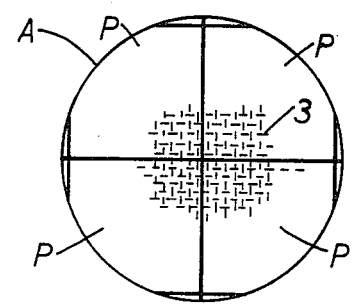
FIG. 2 is an enlarged detail view of area A of the boat of FIG. 1 illustrating four juxtaposed panels.

During the life of the panel, copper from the mesh dissolves and in the panel of FIG. 1 diffuses through the coating layer 8. However, the mesh presents a continuous run of copper alloy which is gradually leached away by the sea water. Thus, the life of the covering may be controlled by suitable choice of the alloy, the mesh size and the diameter of mesh wire, to suit a particular application.

The rate of dispersion of the copper may be further controlled by the application of an electric potential to the mesh, which controls the quantity of copper liberated. Optionally the mesh may include strands of metal other than copper or copper alloy to control the rate of dispersion. For example, nickel may be interwoven to enhance the toxicity of the covering or zinc may be used to inhibit the toxicity.

The above-described covering has the advantages over copper or copper alloy sheets that it is relatively simple to attach to the structure, the electro-chemical reaction between the structure and the copper is avoided that emission of the copper can be controlled, and that there is a cost advantage for selected mesh sizes. In addition the above described covering can be coloured, and the amount of copper ions liberated can be kept to the absolute minimum. These aspects allow the use of the material to be extended far beyond those which would be possible with cupro-nickel or copper alloy plate or which would be possible for a composite whose surface consists predominantly of cupro-nickel.

We claim:

1. A submersible or semi-submersible anti-fouling structure which comprises a layer of a water-insoluble, inert carrier matterial and embedded in said material, a layer of thin flexible woven wire mesh comprising wires of copper or a copper alloy, the mesh size being in the range 3 to 60 mesh per inch, and wherein the woven wire mesh comprises warp and weft wires forming knuckles at their crossover points, the knuckles being upstanding from the two opposed faces of the mesh layer, said mesh layer being completely buried in the material except for all the knuckles on one face only of the mesh layer, all said knuckles being exposed at an outer surface of the layer to provide thereon a multiplicity of tiny, regularly-spaced, discrete evenly-sized metal areas in the inert material continuum outer surface, the said areas being spaced by 0.25 to 7 mm., the total area of the spaced metal areas being between 13 and 50% of the total area of the outer surface of the layer, and wherein the knuckles on the other face of the mesh layer are buried in said layer, and wherein said outer surface of the layer is accessible to sea water and the multiplicity of tiny regularly-space métal areas thereon retard or prevent marine growth on said outer surface.

2. A structure according to claim 1, wherein said total area of the spaced metal areas is less than 35% of the total area of the outer surface of the layer.

3. A structure according to claim 1, wherein the said outer surface is coated with a layer of coating material which is permeable by sea water.

4. A structure according to claim 3, wherein the coating material is the same as the carrier material and is integral therewith.

5. A structure according to claim 3, wherein said coating material is a resin filled with a material which is insoluble in water and which enhances the permeability of said coating layer.

6. A structure according to claim 3, wherein said coating material is a resin filled with a material which is soluble in water and which can be leached out in water to provide a porous coating layer.

7. A structure according to claim 1, wherein the mesh size is greater than about 12 mesh/inch.

8. A structure according to claim 1, wherein the mesh size is about 20 mesh/inch.

9. A structure according to claim 1, wherein the mesh is formed from warp and weft wires having a diameter of from 0.05 mm to 1.5 mm.

10. A structure according to claim 1, wherein one of the warp and weft includes a plurality of strands of copper or copper alloy, and the other of the warp and weft includes strands of different material.

11. A structure according to claim 10, wherein said strands of different material are of plastics material.

12. A structure according to claim 10, wherein said strands of different material are of metal other than copper or copper alloy.

13. A structure according to claim 1, wherein the mesh includes a copper alloy having small amounts of iron or other elements.

14. A structure according to claim 1, wherein the carrier material is polypropylene.

15. A structure according to claim 1, wherein the carrier material is polyester.

16. An anti-fouling panel for attachment to the surfaces of a submersible or semi-submersible structure, said panel comprising a layer of a water-insoluble, inert carrier material having first and second opposed surfaces and, embedded in said material, a layer of thin flexible woven wire mesh comprising wires of copper or a copper alloy, the mesh size being in the range 3 to 60 mesh per inch, and wherein the woven wire mesh comprises warp and weft wires forming knuckles at their crossover points, the knuckles being upstanding from the two opposed faces of the mesh layer, the said mesh layer being completely buried in the inert material except for all the knuckles on one face only of the mesh layer, all said knuckles being exposed at the first surface of the plastics layer to provide thereon a multiplicity of tiny, regularly-spaced, discrete evenly-sized metal areas in the inert material continuum surface, the said areas being spaced by 0.25 to 7 mm., the total area of the spaced metal areas being between 13 and 50% of the total area of the first surface of the plastics layer, and wherein the knuckles on the other face of the mesh layer are buried in said layer whereby the second face of the layer has no metal exposed thereat, and wherein the second surface of the layer can be attached to a said structure whereby the said first surface of the layer is accessible to sea water and the multiplicity of tiny regularly-spaced metal areas thereon retard or prevent marine growth on said first surface.

17. A panel according to claim 16, wherein the area of exposed metal at the first surface is less than 50% of the total surface area of the first surface.

18. A panel according to claim 16, wherein the mesh size is greater than 12 mesh/inch.

19. A panel according to claim 16, wherein the area of exposed metal at the first surface is less than 35% of the total area of the first surface.

20. A panel according to claim 16, wherein the first surface is coated with a layer of coating material which is permeable by sea water.

21. A panel according to claim 20, wherein the coating material is the same as the carrier material and is integral therewith.

22. A panel according to claim 20, wherein said coating material is a resin filled with a material which is insoluble in water and which enhances the permeability of said coating layer.

23. A panel according to claim 20, wherein said coating material is a resin filled with a material which is soluble in water and which can be leached out in water to provide a porous coating layer.

24. A panel according to claim 16, wherein the mesh size is about 20 mesh/inch.

25. A panel according to claim 16, wherein the mesh is formed from wire having a diameter of from 0.05 mm to 1.5 mm.

26. A panel according to claim 16, wherein one of the weft and warp includes a plurality of strands of copper or copper alloy, and the other of the weft and warp includes strands of different material.

27. A panel according to claim 26, wherein said strands of different material are of plastics material.

28. A panel according to claim 26, wherein said strands of different material are of metal other than copper or copper alloy.

* * * * *

UNITED STATES PATENT OFFICE
CERTIFICATE OF CORRECTION

PATENT NO. : 4,375,199

DATED : March 1, 1983

INVENTOR(S) : CHRISTOPHER GRAEME-BARBER et al

It is certified that error appears in the above-identified patent and that said Letters Patent are hereby corrected as shown below:

In the title page, delete the information set forth under Related U.S. Application Data and insert --Continuation-In-Part of Serial No. 2568, Jan. 11, 1979, abandoned.--

Signed and Sealed this

Second Day of August 1983

[SEAL]

Attest:

GERALD J. MOSSINGHOFF

Attesting Officer

Commissioner of Patents and Trademarks